No. 733,539. PATENTED JULY 14, 1903.
P. B. CADY.
FLEXIBLE PHOTOGRAPHIC CARTRIDGE FILM.
APPLICATION FILED APR. 4, 1903.
NO MODEL. 2 SHEETS—SHEET 1.

Witnesses
Edward Rowland
F. M. Donstach

Inventor
Parker B Cady
By his Attorney
Phillips Abbott

No. 733,539.

Patented July 14, 1903.

UNITED STATES PATENT OFFICE.

PARKER B. CADY, OF BINGHAMTON, NEW YORK.

FLEXIBLE PHOTOGRAPHIC CARTRIDGE-FILM.

SPECIFICATION forming part of Letters Patent No. 733,539, dated July 14, 1903.

Application filed April 4, 1903. Serial No. 151,055. (No model.)

*To all whom it may concern:*

Be it known that I, PARKER B. CADY, a citizen of the United States, and a resident of the city of Binghamton, county of Broome, State of New York, have invented certain new and useful Improvements in Flexible Photographic Cartridge-Films, of which the following is a full, clear, and exact description, reference being had to the accompanying drawings, in which—

Figure 1:
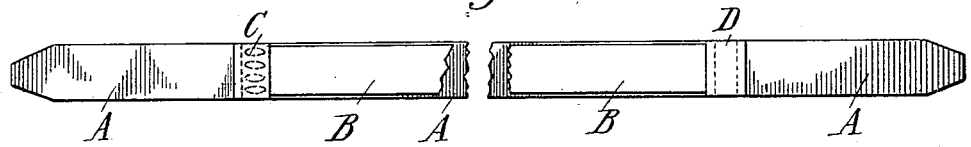
Figure 2:
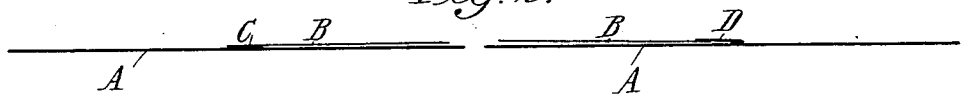
Figure 3:
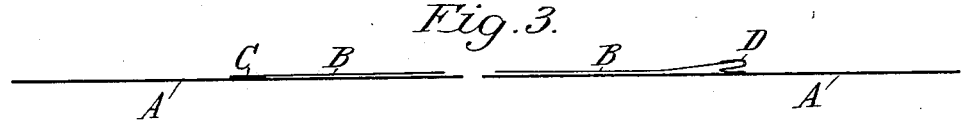
Figure 4:
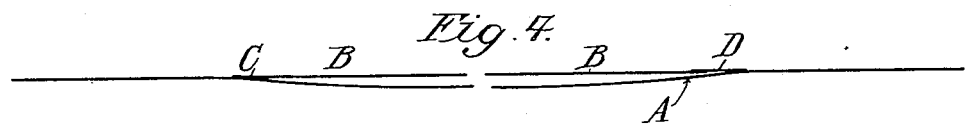
Figure 5:
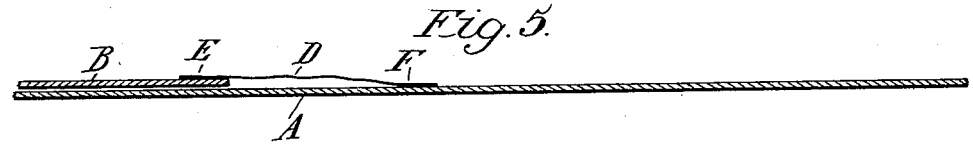
Figure 6:
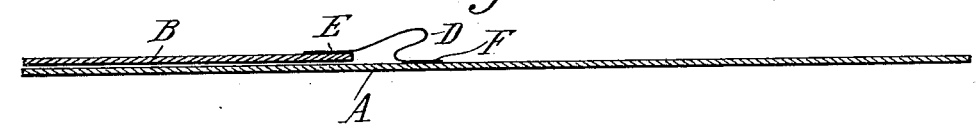
Figure 7:
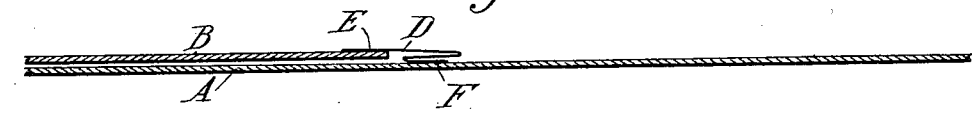
Figure 8:
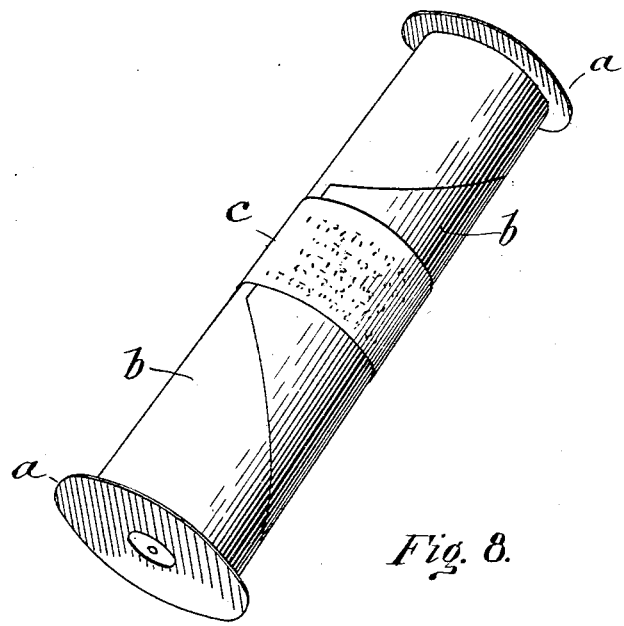

Figure 1 illustrates a plan view of the invention. Fig. 2 illustrates an edgewise elevation of the form of the invention shown in Fig. 1. Fig. 3 illustrates an edgewise elevation of the invention in which the parts bear a slightly different relation to each other from that shown in Figs. 1 and 2. Fig. 4 illustrates an edgewise elevation of the invention in which the parts are so related to each other that the part of the opaque material opposite the film is slack when the film is tense. Figs. 5, 6, and 7 illustrate enlarged views of the invention, showing the so-called "rear" end of the film and the movement of the parts relative to each other during the act of reeling the film from the supply-spool to the winding-spool during exposure in the camera. Fig. 8 illustrates a perspective view of the film with its protective opaque material wound upon an ordinary flanged spool in the usual manner.

The purpose of the invention is to provide means whereby the so-called "loose" or "rear" end of the film may be so attached to the opaque material or black paper that all necessary movement of the former over the latter may be permitted while winding them superposed on each other from one spool to the other during exposure in a camera, and because of this attachment of the film to the opaque material convenient development of the exposed film in the so-called "developing apparatus," such as the well-known McCurdy developing-box, is attained.

The invention may be embodied in a cartridge-film in various ways. I will illustrate as examples two only, which will clearly disclose to those skilled in this art the principles involved and that they may be embodied in various other constructions than those I specifically illustrate and describe.

A indicates the opaque material for the protection of the sensitized film from the action of light. It may be made of black paper, as now commonly the custom, or of any other suitable material. It is as wide as and preferably somewhat longer than the sensitized film, which is superposed upon it in such manner that the opaque material projects beyond the film, for reasons well known and understood, at both ends.

B represents the film. It is attached to the opaque material at its front end C in any preferred manner. I illustrate the method now usually practiced. The rear or normally free or loose end of the film is preferably, but not under all circumstances necessarily, attached to the opaque material in a peculiar manner, as follows:

D is a piece of paper or equivalent material, one edge of which is suitably attached to the rear end of the film, as at E, (see Figs. 5, 6, and 7,) and the opposite edge of the piece D is likewise suitably attached to the opaque material somewhat beyond the end of the film, as at F. The parts of the piece D between the attached edges have no connection either with the film or the opaque material and are free to move. Assuming now that the film and opaque material are equally stretched and lie parallel with each other, as shown in all the figures except Fig. 4, it will be observed that as they both together are wound off from the supply-spool onto the winding-spool during exposure in a camera the film will gradually "crawl," as it is called, in other words, slip over the surface of the opaque material, owing to the fact that the opaque material being outside of the film its convolutions have somewhat greater diameter than the corresponding convolutions of the film, so that as the winding proceeds the piece D being gradually shoved rearwardly by the "crawling" of the film will first become wavy or wrinkled, as shown in Fig. 5. Then as the crawling continues folds will be formed in the piece D, as shown in Fig. 6, and finally as the winding is completed and the piece D is wound upon the winding-reel the pressure flattens down the folds shown in Fig. 6 into the plait-like condition shown in Fig. 7. The piece D may be previously folded and creased to facilitate the above action, if desired.

Fig. 8 illustrates the film with its protective opaque material wound upon an ordinary flanged spool in the usual manner. *a a* are the flanges of the spool. *b b* represent the black paper which is wrapped about, therefore inclosing and protecting, the sensitized film in the usual manner. *c* is an ordinary confining-paster to prevent the black paper from unwinding.

It will be noted that owing to the above-stated construction and arrangement of the parts the rear end of the film is attached to the opaque material even while on the stock-spool and is thereby controlled by it and yet, owing to the peculiar construction of the attaching means, the rear end of the film is permitted all needful independent movement, and, further, that when the film has been exposed it may be conveniently developed in such an apparatus as the McCurdy developing-box, because the attachment of the film to the opaque material will give the latter control over the former and prevent its curling.

In Fig. 4 I illustrated a modified construction in which that part of the opaque material which is opposite the film is somewhat longer than the film, including the means of its attachment to the opaque material, so that when the latter is stretched the opaque material will be slack, as shown, which slack, however, will be taken up during the winding of both together on a spool. This form is sometimes preferred, because thereby the formation of the folds or plaits in the piece D is avoided, yet the essential feature of the control of the film by the opaque material is present.

It will be clear to those who are familiar with this art that many departures may be made from the details of the specific examples illustrated and described by me and still the essentials of the invention be present. I therefore do not limit myself to such details nor to the said specific examples.

It will be understood that my invention is essentially different from a practice now somewhat in vogue of attaching the normally free end of the film to the opaque material after exposure and before placing the same in a developing-box, because my film is at all times, even while on the stock-spool, attached to the opaque material at both ends. Consequently in the use of my invention there is no occasion to unroll the black paper after exposure for the purpose of attaching the film to it. This operation is essential under the practice referred to, and thereby fogging of the film is exceedingly apt to occur.

I claim—

1. In a cartridge-film for photographic purposes the combination of a strip of flexible opaque material, a strip of sensitized film attached at one end to the opaque material, and another piece of material attached at one part to the film and at another part to the opaque material, the whole being wound upon a spool ready for insertion in a camera and adapted for exposure therein.

2. In a cartridge-film for photographic purposes the combination of a strip of flexible opaque material, a strip of sensitized film attached at one end to the opaque material, and another piece of material attached at one edge to the film and at the opposite edge to the opaque material and having a section between the two attached edges not attached to anything.

3. In a cartridge-film for photographic purposes the combination of a strip of flexible and opaque material and a strip of sensitized film attached at both ends to the opaque material, the length of the film between the points of attachment to the opaque material being less than that of the opaque material between the same points, so that when the film is stretched, the opaque material will be slack.

4. In a cartridge-film for photographic purposes the combination of a strip of flexible opaque material, a strip of sensitized film fixedly attached at one end to the opaque material, and another piece of material attached at one edge to the end of the film and at its other edge to the opaque material and having a section between the two attached edges not attached to anything, the arrangement of the film and its attaching means relative to the opaque material being such, that when the film and its attaching means are stretched, the opaque material opposite the film will be slack.

5. In a cartridge-film for photographic purposes the combination of a strip of flexible opaque material, a strip of sensitized film fixedly attached at one end to the opaque material and movably attached thereto at the other end by means adapted to be longitudinally pushed together or collapsed by movement of the film longitudinally of the opaque material during the winding operation.

In testimony whereof I have signed my name to this specification in the presence of two subscribing witnesses.

PARKER B. CADY.

Witnesses:
 T. M. NILES,
 H. H. SMITH.